Jan. 7, 1947. D. B. PERRY 2,413,843
SILENT TYPE CHAIN WITH V-TYPE ANTIWHIPPING PINTLE
Filed July 22, 1943
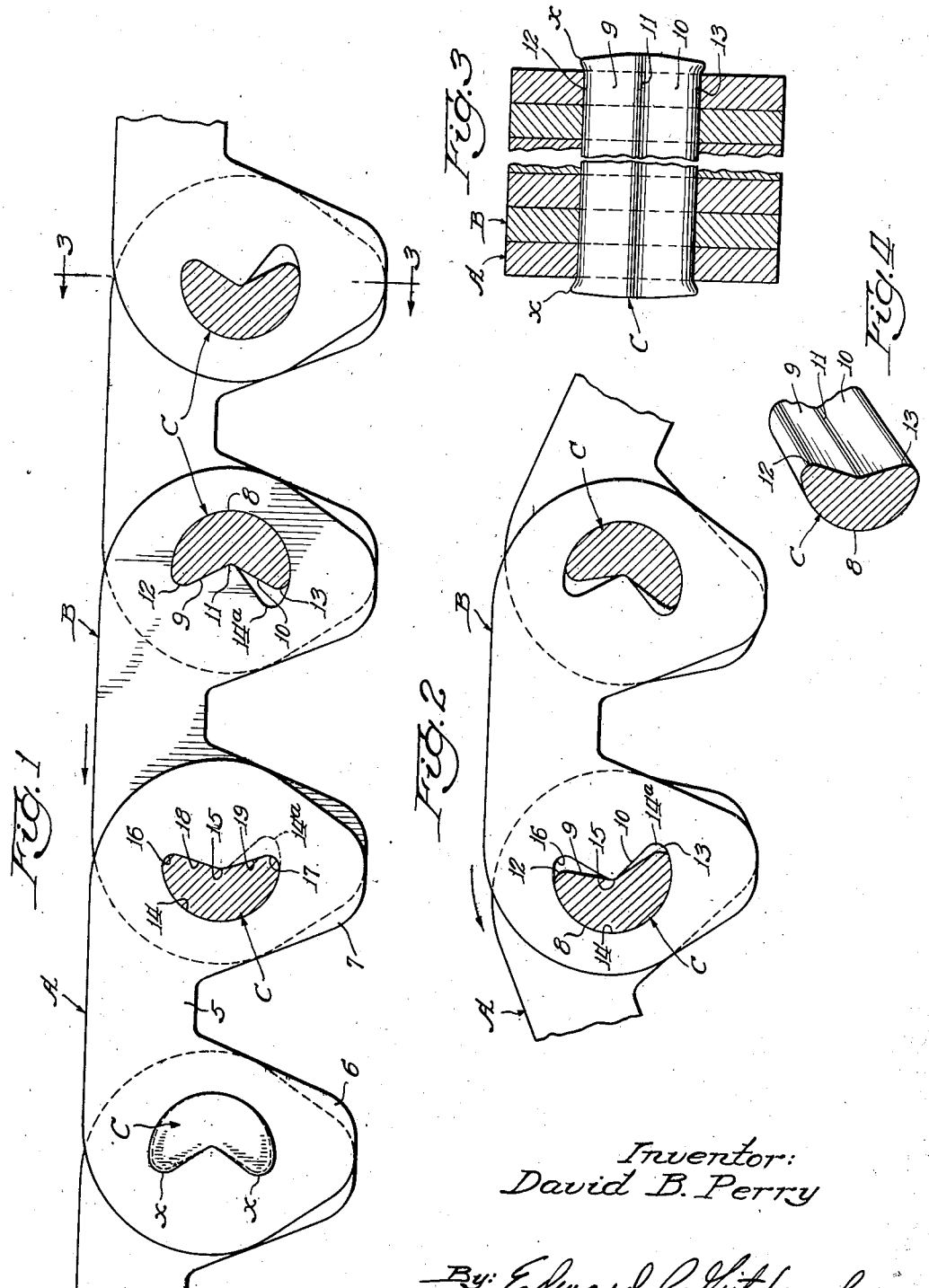
Inventor:
David B. Perry
By: Edward C. Fitzbaugh
Atty.

Patented Jan. 7, 1947

2,413,843

UNITED STATES PATENT OFFICE 2,413,843

SILENT TYPE CHAIN WITH V-TYPE ANTIWHIPPING PINTLE

David B. Perry, Ithaca, N. Y., assignor to Morse Chain Company, Ithaca, N. Y., a corporation of New York Application July 22, 1943, Serial No. 495,704

4 Claims. (Cl. 74—251)

This invention relates to transmission chains, and particularly to chains such as are commercially known as the silent type.

The present invention aims to improve the construction of chains of the character contemplated herein, and to accomplish this in a novel manner.

It is an object of the present invention to provide a silent type chain wherein the articulation or joint between the links will permit of a desirable relative movement of the successive links during the operation of the chain in association with the rotatable sprocket.

Another object of this invention resides in so shaping the pintles or pins and the cooperating bearing apertures in the links that they will restrain backward flexing or hinging of the chain and also will prevent the whipping action which is common to drive chains.

The novel construction of the pintles and the bearing apertures is such that the forces which tend to limit the single relative motion between the links will be applied in a manner which renders them less troublesome than in chains heretofore available, with the result that the present chain is capable of more dependably withstanding severe usage than the prior structures.

Other objects, features, and advantages of the present invention will be apparent to persons skilled in the art after the construction and operation of these improvements are understood from the within description. Among these additional objects may be mentioned that the invention aims to provide a chain that is efficient and dependable in the performance of its functions; its construction is sturdy; and it is comparatively economical to produce.

It is preferred to practice the herein contemplated invention in substantially the manner described and as particularly pointed out in the appended claims, in connection with which reference is made to the accompanying drawing which forms a part hereof:

Fig. 1 is a side or longitudinal elevation of the improved chain with one of the adjacent link plates removed and the pintles shown in section. In this view the links of the chain are shown in a straight line or common longitudinal plane.

Fig. 2 is a view similar to Fig. 1 showing the relative positions of the links and pintles when the chain is curved or bent in a manner to engage a sprocket element, the nearest link plate being shown in full elevation.

Fig. 3 is a sectional view made on the plane of line 3—3 on Fig. 1, looking in the direction of the arrows.

Fig. 4 is a perspective view of a pintle which forms a portion of the articulation between the links of the chain.

The drawing may be understood as being made on an enlarged scale to more clearly define the details of the articulation or point between successive links, and in the drawing like reference characters are used to identify the same parts wherever these parts appear in the different views.

The chain contemplated herein, and which is shown in the drawing, preferably comprises a plurality of sets A and B of link plates and pintles C which connect the links to provide an articulated joint or hinge connection between the successive links. These links are of the toothed outline or contour usually employed for silent chains, and they embody a plurality of metal plates for each set that are of inverted U-shape or arched form, and the plates of the link set A are side by side in laterally spaced arrangement with respect to each other, whilst the ends of the plates of the next link set B are interposed between them. Thus it will be seen that all of the plates of each link set are maintained in their proper transversely spaced relation to each other at all times.

A plate of a link set is shown as embodying a straight portion 5 with teeth 6 and 7 at the respective ends thereof, and said teeth providing the lateral elements of the link plate which are adapted for engagement with the sprocket teeth. The contours of all of the link plates are substantially the same, and in their assembled form the teeth of the successive plates will overlap the proximate teeth of preceding and succeeding plates as illustrated in Fig. 1. The articulation or joint between the sets of links A and B embodies the pintles C and suitable pintle-receiving apertures which are located in the overlapping teeth 6 and 7 of the plates of the link sets.

The pintle C is an elongated metal pin that in cross-section is in the shape of a mutilated cylinder, the arcuate portion of which provides a convex bearing surface 8 of segmental contour and it preferably comprises substantially one-half or semi-cylindrical portion of the pintle C. The remaining surface of the pintle is formed with an inwardly extending recess that is of a flattened or wide V-shape and extends longitudinally from end to end of the pin. This recess has two plane work faces 9 and 10 that converge inward toward each other and the reentrant angle where these plane faces merge or approach each other is formed in a concavely curved seat 11 that is of relatively small radius. It will be noted that the proximate marginal portions of these plane converging faces 9 and 10 are extended inward past the axis of the pintle and also that the radius of the concave seat 11 is struck from the axial center of the pintle. Furthermore, the plane faces 9 and 10 are disposed at an obtuse angle to each other, such angle being approximately 120°.

The outer marginal portions of the plane faces 9 and 10 of the pintle recess are merged with the adjacent portions of the cylindrical portion or convex bearing surface 8 of the pintle in the form of arcuate convex apices 12 and 13 both of which have a radius that is greater than the radius of the inner concave seat 11, and said apical radii are struck from a plane passing diametrically through the axis of the pintle. It will of course be understood that while these dispositions and proportions are preferred they nevertheless are optional and therefore they are subject to variation and change according to the particular requirements of the chain.

The plates of the link set A are provided with pintle-receiving apertures adjacent their ends in the teeth 6 and 7, and in the present instance these apertures are substantially counterparts of the cross-sectional shapes of the pintles C so that there will be a snugly fitting arrangement of the pintles with respect to these apertures in the plates of the links A as shown toward the left in Fig. 1. The apertures in question comprise segmental shaped concave portions 14, concentric with the axes of the pintles, to be engaged with the convex bearing surfaces 8 of the latter, and these apertures also have wedge-shaped portions 15 projecting towards the concave portions 14 to enter the V-shaped recesses of the pintles so that the counterpart converging sides of the wedges 15 and the pintle recesses will contact each other as shown at the left in Fig. 1. Also there are arcuate concave portions 16 and 17 which merge the junctures between the segmental concave edges 14 and the adjacent margins 18 and 19 of the wedge-shaped portions 15. In assembling this portion of the chain, after the pintles have been inserted through the link apertures, the outer ends of said pintles have their edge portions upset, as shown at x in Fig. 1, to hold the parts in assembly and maintain them in proper relation to each other and against independent relative movement.

The pintle-receiving apertures in the plates of the link set B are of such shape that sufficient clearances are provided between the plates and the pintles to permit an articulated or swinging movement of the link set B relative to the leading and trailing link sets A of the chain. This is accomplished by elongating the arcs of the concave bearing edges 14 of said apertures in a manner such as suggested at 14a in Figs. 1 and 2. This will permit a fulcruming of the apices 15 of the wedge-shaped portions of the apertures with respect to the inner concave seats 11 in the recesses of the proximate pintles. This is due to the fact that the angle of the straight edges 18 and 19 of the apertures in these link plates B are made more acute than the angle formed by the plane faces 9 and 10 of the cooperating pintle.

By reason of the arrangement just described, when the chain is in a straight line, the convex terminal end 12 of a pintle will be engaged in the outer concave seat 16 of the aperture in the link plate B, and the opposite convex terminal end 13 of this pintle will be out of engagement with the other or inner concave seat 14a of said aperture. This is shown in detail in Fig. 1. When the chain has been moved into operative relation with respect to a sprocket element, the plate in link set A will have hinged towards the axis of the sprocket causing a rotation of the trailing pintle (which is fixed to link set A), thus moving the outer convex terminal end 12 out of its concave seat 16 in link set B and simultaneously therewith the inner convex terminal end 13 of the pintle will be moved towards the extended portion of the aperture to dispose said terminal portion 13 near but not engaged in the concave seat 14a of said link set B. As shown in detail in Fig. 2, when the chain is flexed to engage the sprocket the links B will be fulcrumed on the pintles C by the engagement of the apices 15 in the concave seats 11 of the pintles; and, due to the predetermined difference of angularity of pintle surfaces 9 and 10 with respect to the aperture edges 18 and 19, the latter edges 19 will not come into contact with the confronting faces 10 of the pintles. This arrangement provides a clearance that is greater than needed for the smallest number of teeth in any sprocket on which the chain is used.

During the straight travel of the chain (Fig. 1), the successive links are restrained from any backward flexing and the tendency of the chain to slip is prevented because the concave seats 16 perform the functions of stops which limit the movement of the terminal ends 12 of the pintles. By comparative reference to Figs. 1 and 2, it will be observed that the semi-cylindrical or segmental surfaces 8 of the pintles are constantly engaged with the segmental bearing surfaces 14 of the pintle apertures in the link plates of the set B, and when the chain is in the straight position which has been illustrated, the terminal ends 12 will be engaged in the concave seats or stops 16. Also, in this straight position, the plane faces 9 of the recesses in the pintles will be engaged with the corresponding straight edges 18 of the pintle apertures in the plates of the link set B. Thus, a very desirable amount of bearing surface is provided between the elements which form the articulations in the chain, and effective abutments or stops are provided which are adapted to limit the amount of relative movement of the link sets in a backward direction with respect to each other, and the link sets B with respect to their pintles C.

This invention has been described in detail in its present preferred form or embodiment, and it will be obvious to those skilled in the art, after understanding said invention, that various changes and modifications may be made therein without departing from the spirit or scope thereof. It is aimed in the appended claims to cover all such changes and modifications.

I claim:

1. An articulated joint for silent type chains, embodying a pintle and a coacting apertured link, said link aperture and the cross-section of said pintle having counterpart contours, each of said contours comprising a segmental portion concentric to the axis of the pintle and two inwardly converging straight portions, the segmental portion of the aperture having a longer arc than the segmental portion of the pintle to adapt the link and pintle for relative rotative movement with respect to each other, the said movement limited in both directions by the respective straight portions.

2. An articulated joint for silent type chains, embodying a pintle and a coacting apertured link, said link aperture and the cross-section of the pintle having counterpart contours, each of said contours comprising a segmental portion concentric to the axis of the pintle and two inwardly converging straight portions, the pintle and the link adapted for relative rotative movement with respect to each other, the angle formed by the straight portions of the aperture having more acuity than the angle formed by the straight portions of the pintle and providing clearance for said relative rotative movement of the pintle and link and also limiting such movement in both directions.

3. In a silent type chain, a joint therefor embodying a pintle having an arcuate surface, said pintle provided with a longitudinal recess opposite said arcuate surface that is formed by a plurality of plane faces extending through the working length of said pintle; and a pintle-receiving aperture in a chain link having a concave bearing portion engaged with the arcuate bearing surface of the pintle, said aperture provided with a wedge-shaped portion the sides of which are straight and afford surface contact of substantial area when engaged with a respective plane face of the pintle recess.

4. In a silent type chain, a joint therefor embodying a pintle having a cylindrical bearing surface upon one side, the opposite side of said pintle provided with a longitudinal recess consisting of a plurality of converging plane surfaces extending inward and providing a concave seat adjacent the axis of the cylindrical surface; and a pintle-receiving aperture in a chain link having a segmental bearing portion engaged with and concentric to the cylindrical surface of the pintle, said aperture provided with a wedge-shaped portion having straight sides converged inward and providing a fulcral apex that engages the concave seat in the pintle recess, the sides of said wedge-shaped portion providing a flat surface contact with the plane faces of the pintle recess.

DAVID B. PERRY.